Jan. 12, 1932.  C. W. HELM ET AL  1,840,625
ROTARY ENGINE
Filed Aug. 4, 1926    3 Sheets-Sheet 1
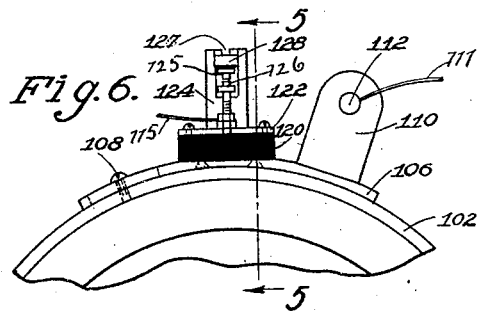
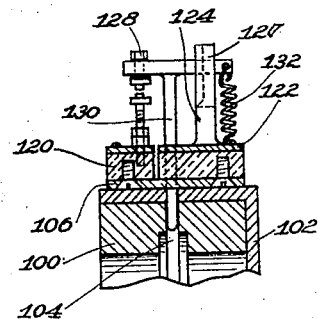
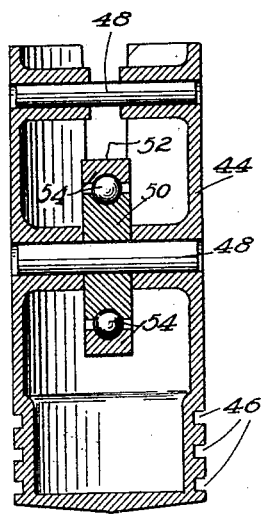
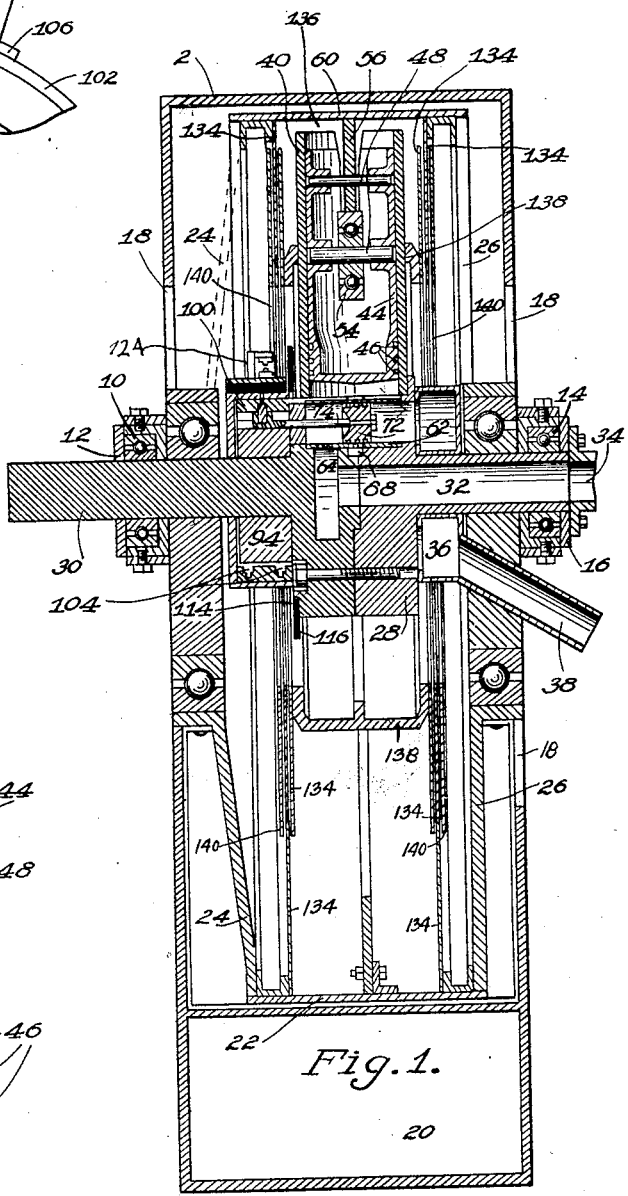
INVENTORS
C. W. HELM
E. SELLBERG
BY Fred H Hayes
ATTORNEY Jan. 12, 1932.  C. W. HELM ET AL  1,840,625
ROTARY ENGINE
Filed Aug. 4, 1926  3 Sheets-Sheet 2
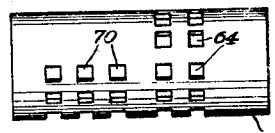
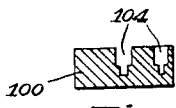
Fig. 9.
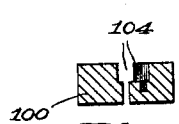
Fig. 10.
Fig. 7.
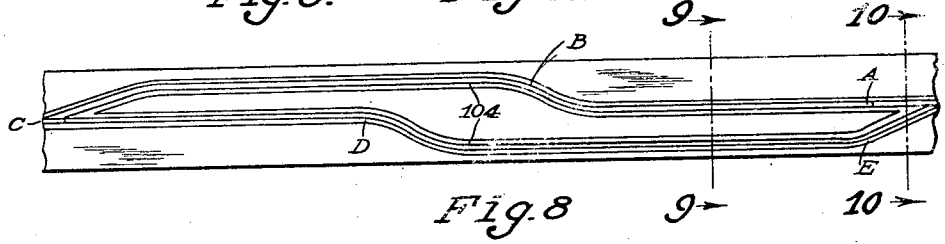
Fig. 8
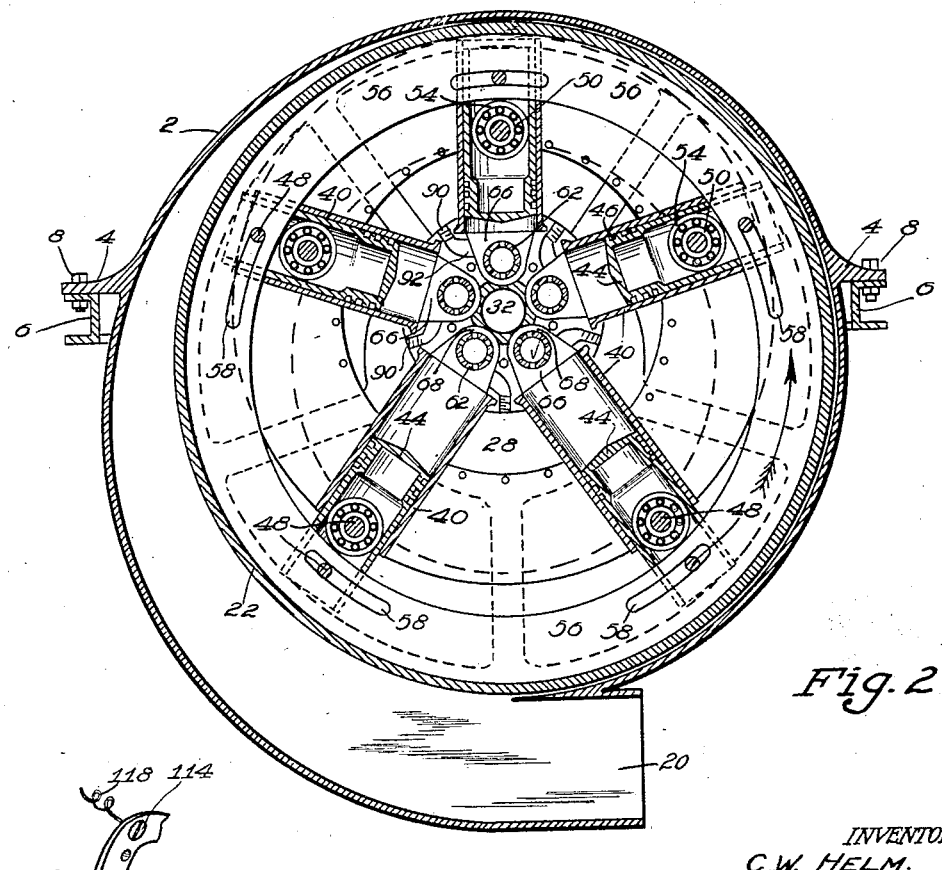
Fig. 2.
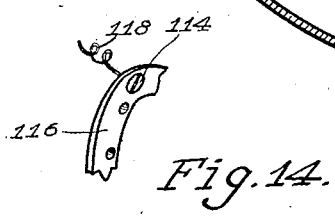
Fig. 14.
INVENTORS
C.W. HELM.
E. SELLBERG
BY Fred H Hayn
ATTORNEY Jan. 12, 1932.   C. W. HELM ET AL   1,840,625
ROTARY ENGINE
Filed Aug. 4, 1926   3 Sheets-Sheet 3
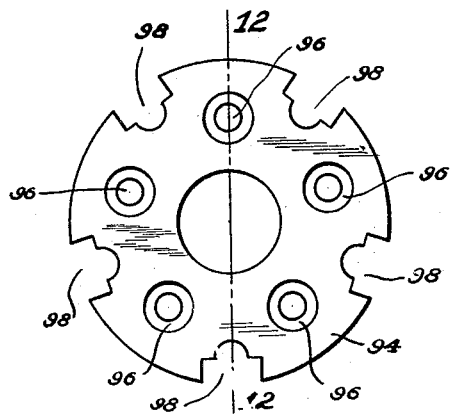
Fig. 11.
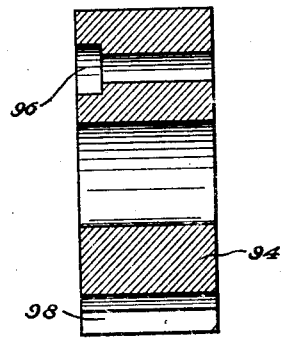
Fig. 12.
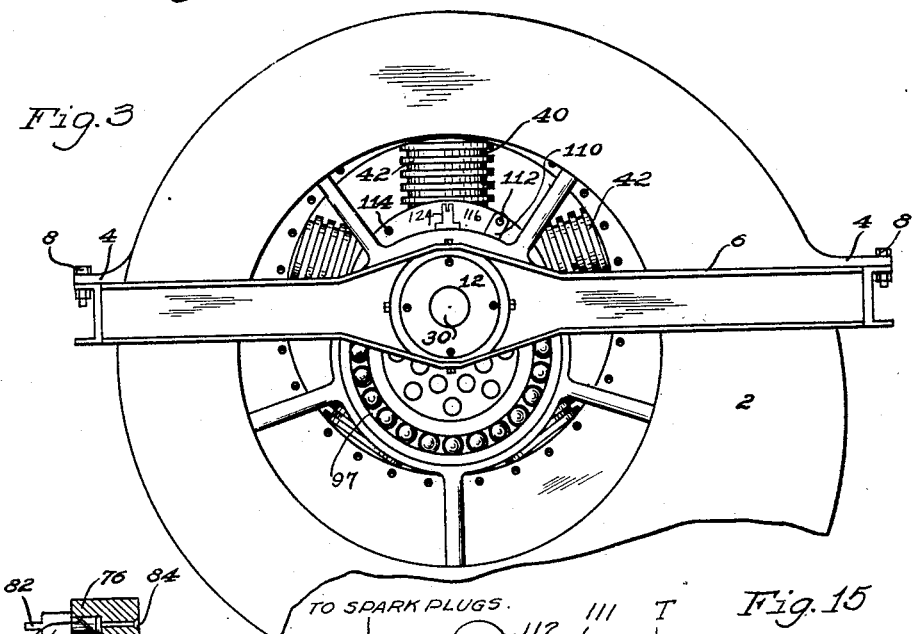
Fig. 3
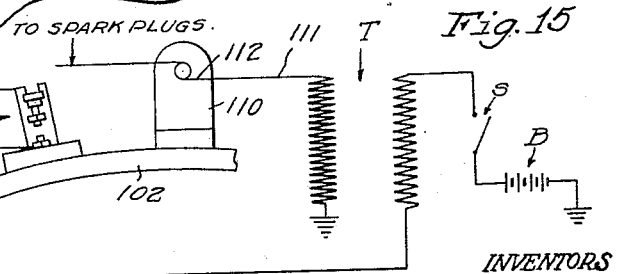
Fig. 13.   Fig. 15
INVENTORS
C. W. HELM.
E. SELLBERG.
BY Fred H Hayn
ATTORNEY.

Patented Jan. 12, 1932

1,840,625

UNITED STATES PATENT OFFICE

CHARLES WESLEY HELM AND ENOCH SELLBERG, OF WINSLOW, ARIZONA

ROTARY ENGINE

Application filed August 4, 1926. Serial No. 126,974.

Our invention relates to rotary engines, and more particularly to rotary internal combustion engines, in which a set of cylinders equipped with reciprocating pistons is adapted to be rotated about a rotatable shaft positioned in eccentric relation with the reciprocating pistons within said cylinders, the rotation of said shaft being accomplished by the reciprocation of said pistons, the invention being an improvement on that disclosed in a prior patent granted to Enoch Sellberg, #1,526,610, on February 17, 1925.

An object of our invention is to simplify and improve the structures heretofore proposed, and more particularly the structure disclosed in the hereinbefore patent mentioned, said rotary engine comprising a set of cylinders of odd number associated in any preferred manner with a cylinder block or head, which head is adapted to be rotated with said cylinders, a set of novel form of pistons, each reciprocating in said cylinders, being provided to transmit the reciprocatory motion of said pistons by means of a ring or other member to a rotary part-solid and part-hollow shaft, the entire assembly being rotated in an outer preferably snail-shaped casing, which casing provides for the efficient cooling of said engine.

A further object of our invention is to provide a novel form of valve actuating mechanism for operating a set of preferably reciprocating piston valves to control the admission of the motive fluid to said cylinders, providing for suction, compression, power and scavenging strokes of the pistons, said valves controlling effectively the exhaust, which mechanism comprises a distorted track within which an extension associated with the stem of said valve operates, said extension periodically actuating a novel form of make and break mechanism for supplying the electrical energy to cause the spark plugs to function.

It is also an object of our invention to provide the spokes of the inner revolvable casing with a set of cooling fins or blades of different sizes, the largest of which are placed on the side where the valve actuation is positioned, since very little air is permitted to enter this side of the engine, so that air or other cooling medium is allowed to be passed across the cylinder block, much in the manner of a centrifugal blower, the shape of the outer stationary casing facilitating this feature.

A still further object of our invention is to position the exhaust manifold on the main bearing support, and preferably surrounding the hollow part of the rotary shaft, providing a vaporizing hot spot for the motive fluid entering the engine, the motive fluid entering said hollow shaft also assisting in cooling the center of the cylinder head block.

It is also within the province of our invention to provide a novel form of ignition system in which a movable base plate, preferably equipped with a pin and slot connection for adjusting purposes, is provided with a distributor post, insulated from said plate, and adapted periodically to make electrical connection with a circular bus bar or collector ring in electrical connection with a source of electrical energy, said movable base plate being also equipped with a spring retarded trigger for actuating a make and break assembly insulated in part from said plate, said trigger being adapted to coact with the valve stem extension moving in the distorted track to actuate said make and break assembly.

It is moreover within the province of our invention to mount the motive fluid generating device on the dust cover plate associated with the main shaft bearing through which the hollow part of said shaft extends.

A still further object of our invention is to provide a novel form of lubricating system, for effectively lubricating the cylinders, which construction also assists in bracing the same, holding said cylinders to the head block, and permitting a much higher number of revolutions per minute to be used, without any danger of said cylinders flying off by reason of the centrifugal force generated, thus providing a marked improvement over known rotary engines, it being possible to obtain but 1700 R. P. M. whereas by the use of our invention as high as 5000 R. P. M. may be obtained.

It is also within the province of our invention to position the spark plugs in advance of the direction of rotation of the cylinders to prevent the cylinder oil from reaching said spark plugs and causing the same to become fouled.

A still further object of our invention is to provide a novel form of valve for controlling the inlet and exhaust of the motive fluid to the cylinders, a set of packing rings being provided thereon to seal effectively the compression when the valve is on center, and also to prevent the exhaust gases from leaking into the inlet manifold, a ported bushing or sleeve being associated with said valve, said ports being used for balancing purposes, and moreover to permit the valve to move more easily, resulting in minimum wear and greater efficiency, and permitting lighter parts to be used.

It is also our intention to improve the piston construction, making a more substantial structure by the use of a pair of wrist pins associated with the ring and roller construction.

It is also an object of our invention to provide a novel form of rotary engine which is simple in construction, being composed of a minimum number of parts, thoroughly efficient and reliable in operation, not easy to get out of order, and one which will thoroughly and reliably effect the objects intended.

Further objects and advantages of our invention will become more apparent as the description thereof proceeds.

Reference is had to the accompanying drawings, in which similar reference characters denote similar parts. In the drawings, Fig. 1 is a vertical section of our rotary engine, taken in line with the crank shaft, Fig. 2 is a vertical section taken transversely through the crank shaft and through both the outer and inner casings, Fig. 3 is a side elevational view of the engine, Fig. 4 is an enlarged cross-sectional view of one of the pistons, Fig. 5 is a fragmentary sectional detail view of the make and break mechanism disclosing the manner in which the trigger operating the same is actuated by the valve stem extension moving in the distorted track, Fig. 6 is a fragmentary detail side elevational view of Fig. 5.

Fig. 7 is an enlarged plan view of the valve sleeve or bushing,

Fig. 8 is a flat detail view of the distorted track for guiding the valve stem extension for operating the valves, Figs. 9 and 10 are transverse cross-sectional views taken on the lines 9—9, and 10—10, Fig. 8, Fig. 11 is an enlarged side elevational view of the valve stem cross head to relieve the strain on the valve stems, Fig. 12 is a vertical section taken on the line 12—12, Fig. 11, Fig. 13 is a part sectional and part elevational view of the piston valve, stem and extension, Fig. 14 is a fragmentary detail perspective view of the collector ring of insulated material bolted to and rotatable with the cylinder head block, and Fig. 15 is a diagrammatic view of a suggestive form of electric circuit for the ignition system.

Describing our invention more in detail, we provide an outer casing, preferably of snail form, and much like that of a centrifugal blower, equipped with flanges 4 whereby said casing may be mounted upon a framework 6 to which said casing may be bolted as indicated at 8, which framework is shaped and bored to provide a bearing support, within which is mounted a bearing 10 covered by a dust cover plate 12, bolted or otherwise associated with said bearing (see Figs. 1 and 3) the framework on the opposite side of the engine being equipped with a support and a similar bearing 14, and a dust cover 16, said bearings being of the conventional ball bearing type.

The sides of the casing 2 are provided with air cooling medium inlet openings 18, which permit the entry of said medium near the center of the engine, and exhaust at 20 by centrifugal action as the inner casing 22 is rotated, a set of cooling fins or blades 24 and 26 being provided to assist the cooling medium in cooling the engine, said blades or fins being bolted to the spokes of the lubricating pans, to be presently described, thus cooling the engine to a marked degree, irrespective of weather conditions, the blades or fins 24 being of larger size than the blades 26 to draw the cooling medium across the cylinder head block 28, (see Figs. 1 and 2), since very little of said cooling medium is permitted to enter the engine from the valve actuation side thereof.

If desired, the main shaft 30 may be divided and bolted together, as shown in Fig. 1, and may be integral with the cylinder head block 28, for the sake of simplicity and ease of manufacture, said shaft being part hollow as indicated at 32 for the entry of the motive fluid or gaseous mixture from the fluid generating device or carbureter 34 bolted to the dust cover 16. See Fig. 1. This manner of admitting the motive fluid not only is convenient, but also serves to cool the cylinder head block 28, an exhaust manifold 36, bolted or otherwise associated with the stationary main bearing support and surrounding the inlet pipe or hollow shaft 32, thus providing an efficient hot spot for vaporizing the mixture, said exhaust manifold serving to muffle the exhaust and permitting the exhaust gases to be conducted to any convenient point through the exhaust pipe 38. Of course, any other preferred means may be substituted for the structure just described, and still remain within the province of our invention.

Any preferred odd number of cylinders 40 may be used, which cylinders are bolted, screwed or otherwise associated with the cylinder head block 28 as in practice desired. To assist in cooling said cylinders, their outer surfaces are equipped with fins 42 (see Fig. 3), to assist in the circulation of the cooling medium about the cylinders thus preventing the formation of dead air or cooling medium pockets between said cylinders.

Each cylinder 40 is equipped with a reciprocating piston 44, shown more particularly in Fig. 4, said pistons being of hollow construction and provided with packing grooves 46 for the reception of suitable packing, said pistons being provided with a pair of wrist pins 48, the lower of which is equipped with a roller 50 surrounded by a roller bearing 52 housing anti-friction balls 54, the upper wrist pin 48 passing through an annular ring 56 slotted as at 58, which ring is secured to the annular band 60 of the inner casing 22, the roller bearing 52 engaging with the inner periphery of the ring 56.

As seen more particularly in Fig. 2, the cylinder head block 28 is recessed in the neighborhood of each cylinder end to house a set of valve sleeves or bushings 62, one of which is shown in Fig. 7, said recesses being flared at 66 as shown in Fig. 2, and a groove 68 being provided to surround said bushing so that the valve may be balanced, the ports 64 in said bushing being provided for this purpose. The ports 70, which extend but part way around the periphery of the bushing comprise the motive fluid ports.

Positioned in each of the recesses in the cylinder head block is a piston valve 72, shown more particularly in Fig. 13, which valve is adapted to be operated in the bushing 62, and is equipped with a valve stem 74, the outer end of which has a projection 76, extending therefrom, which extension is recessed at 78 to house an oscillatable pin or other member 80, equipped with a cam projection 82 adapted to extend within the distorted track, presently to be described. The outer end of the valve stem 74 is also provided with an oiling means 84, the member 80 being also grooved for this purpose as at 86.

As seen more particularly in Fig. 13, the valve 72 is provided with a set of packing ring grooves 88, preferably three in number, the two outermost of which are adapted to seal the compression in the cylinders when the valve is on center, as depicted in Fig. 1. The intermediate packing ring serves to prevent the exhaust gases from leaking into the inlet manifold when said valve is moved to allow the exhaust gases to escape, said ring effectively sealing the ports until the valve has passed them. It will be clear that the grooves 68 permit an accurate balancing of the valves 72, permitting easy reciprocation of said valve and reducing wear thereon to a minimum, and at the same time permitting lighter parts to be used than would be needed if this feature were not supplied.

As seen more particularly in Fig. 2, the cylinder head block 28 is bored and screw-threaded as at 90 for the reception of spark plugs, which are placed in advance of the direction of rotation of the engine or motor, so that any lubricating oil may effectively be prevented from reaching the spark plug portion of the combustion chambers, and from collecting on said plugs to foul the same, said bored portions being flared as indicated at 92 to facilitate the expulsion of the exploded mixture.

Figs. 11 and 12 disclose more particularly the valve stem cross head 94 bolted to the cylinder head block 28, and rotatable therewith, the bolt holes 96 being provided for this purpose. Corresponding to the number of valves used, the cross head 94 is grooved or recessed as at 98 to receive the valve stem 74 to relieve the strain thereon and to permit of a free and easy reciprocation therein.

Surrounding this cross head, as seen more particularly in Fig. 1, is a ring 100, positioned in a housing 102, which ring and housing are bolted or otherwise secured to the stationary main bearing support and accordingly do not rotate. It is in the ring 100 that the distorted track 104, shown by the flat view of Fig. 8, is positioned, the projection or member 82 (Figs. 1 and 13) operating in said track.

The track 104 provided for the movement of the valves 72, the part A B operating said valve for the compression stroke of the pistons 44, the part B C the suction stroke, the part C D the power stroke, and D E the exhaust.

The ignition mechanism is depicted more particularly in Figs. 5, 6 and 14, and comprises an adjustable plate or base 106, preferably curved to conform to the contour of the casing or housing 102, and equipped with a bolt and slot 108 to permit said plate or base to be adjusted so that the spark may be advanced or retarded by adjusting the bolt or other means provided therefor, a distribution post 110 of any preferred type, equipped with an electrode 112 adapted to be brought into electrical connection with a series of electrodes 114 positioned on the collector ring 116, made of suitable insulating material, and bolted to the cylinder head block and of course rotatable therewith, the wires 118 (Fig. 14) leading to the spark plugs.

Mounted on the plate 106 by screws or otherwise, and insulated therefrom by the material 120, which also may be made of bakelite, is a plate or base 122 secured to said material in any manner desired. Also mounted in the plate 106 is a slotted upstanding arm 124, either integral with said plate 106 or secured thereto in any manner preferred. The slot 127 is of the form disclosed in Figs. 5 and 6 so that it may form a guide for the movable cross bar 128 which has associated therewith in any preferred manner the trigger 130 adapted to be operated by the projection 82 (Fig. 13), as said projection moves within the cam track 104, a retarding spring or other resilient means 132 being provided to resist the movement of the arm 128 and hence the trigger 130.

The make and break assembly comprises a set of preferably platinum electrodes 125 and 126, the electrode 125 being grounded through the trigger 130, while the electrode 126 is insulated from the ground and while an electric lead 115 connects the electrode 126 with a conventional or other form of electric mechanism, not shown, for producing the required spark on the spark plugs, the lead 111 leading from a conventional or other form of electric mechanism (working in connection with the make and break assembly) to the electrode 112 and hence to the electrodes 114 on the collector ring 116 in timed relation. The lower electrode 126, which may be adjustable in the conventional manner disclosed in Figs. 5 and 6.

A suggestive form of ignition circuit is shown in Fig. 15, wherein the storage battery B may be that of the motor vehicle, the negative terminal thereof being grounded as shown, the positive terminal being connected to the secondary winding of the coil T through the switch S, the primary winding of said coil being grounded, and also connected to the distributor terminal 112 of the distributor post 110 on the housing 102. The secondary winding of the coil T is also connected to the condenser C, grounded, as shown, and connected to the make and break assembly 126 by the wire 115 to the lower contact, said upper contact being grounded as hereinbefore explained. See Figs. 5 and 6. The distributor terminal wire leads to the spark plugs. See also Fig. 14.

As seen in Fig. 1, the means whereby the cylinders 40 are lubricated comprises a set of oil receptacles 136 each disposed about each of said cylinders, composed of an inner circular pan or receptacle 134, secured to the inner end closure 138 for the oil receptacle 136, which closure may be secured to the cylinder 40 by any preferred means, such as bolts, not shown, for the sake of clearness. Surrounding each of said pans or receptacles, and movable relatively thereto are the outer complementary pans 134, secured to the framework by any suitable means, and the outer ends of each of the oil receptacles, thus formed, is closed by a circular band or ring 60.

To prevent dirt from seeping into the oil receptacles 136, another circular pan 140 surrounds the two relatively reciprocating pans 134, bolted or otherwise secured in place to the engine casting. See Fig. 1. Any suitable means may be provided for introducing oil into the receptacles 136.

This structure assists in holding the cylinders to the casting of the engine, bracing said cylinders, and permitting a much higher number of revolutions per minute without danger of the cylinders flying off by reason of centrifugal force, it being possible in practice to obtain approximately 5000 R. P. M.

The operation of our apparatus should now be clear. The motive fluid provided by the fluid generating structure 34 is sucked into the cylinders on the outward movement of the pistons 44, and is compressed upon the following inward movement, the valve 72 being in this case in the central position depicted in Fig. 1. Contact being established between the electrodes 114 and 112, by the rotating collector ring 116 said electrodes are brought into contact, electrical connection being established with the spark plug and the mixture is ignited, resulting in the firing or power of the piston, which is forced outwardly, the movement of said piston being transmitted through the roller 54 and ring 56 through the wrist pin and slot constructions, giving the inner casing a rotative impulse, which carries a rotative movement of the shaft 30 through the conventional ball bearing construction 97 depicted in Fig. 3, the direction of rotation being indicated by the arrow on Fig. 2, the eccentric mounting disclosed causing the leverage to rotate said shaft.

At the end of the power stroke the exhaust gases are expelled through the ports in the bushing 62, the valve 72 having been moved by reason of the oscillating extension 82 on the valve stem, movable in the distorted track 104, to the exhaust manifold 36, and out the exhaust pipe 38.

The shape of the track 104 permits one complete cycle of valve operation for two revolutions of the engine, as described.

While we have thus described our invention with great particularity, it will be clear that the same may be modified throughout a wide range. We accordingly do not propose to be limited to the exact details of construction shown and described, but reserve the right in practice to make any and all modifications thereof that fall within the scope of the appended claims.

We claim as our invention:

1. In a rotary motor, in combination, outer and inner casings, a set of radial cylinders mounted in said inner casing, a reciprocable piston in each of said cylinders and adapted to rotate said inner casing, and sets of cooling blades of different sizes associated with each of said casings, said blades insuring that the cooling medium introduced at the center of said motor will effectively cool said motor and prevent dead cooling spaces therein.

2. In a valve actuating means for a rotary engine, in combination, a set of valves, a valve stem for each valve, a stationary ring member equipped with a distorted track, a rotary valve stem support adapted to be rotated within said ring member, said support being provided with grooves to facilitate the reciprocation of said valve stems, each of said valve stems being provided with a socket and means for oiling the same, and an extension in each of said sockets and adapted to be oscillated in said track.

3. A piston valve adapted for especial use in connection with a rotary engine, said valve comprising a piston, a set of packing rings on said piston, two of which are adapted to seal the compression stroke of the piston associated with said engine when said valve is on center, the intermediate packing ring being adapted to prevent the exhaust gases from leaking into the inlet port, a valve stem secured to said piston, said stem being equipped with a socket and means for oiling same, and an oscillatible extension positioned in said socket and equipped with means for oiling said extension.

4. In a rotary engine, in combination, a casing, a hollow shaft in said casing, said shaft functioning for the admission of the motive fluid, a dust cover plate on the outer end of said shaft, and a motive fluid supply means secured to said dust cover plate.

5. An ignition system adapted for special use in connection with a rotary engine comprising a valve action casing, a movable plate on said casing, said casing being provided with a slot, a distributor brush having an arm extending through said slot, and a set of make and break connections associated with said brush.

6. In an ignition system adapted for special use in connection with a rotary engine, in combination, a valve action casing, said casing being provided with a distorted cam track, a valve actuating means adapted to be moved in said track, a movable base on said casing equipped with a slot, a trigger extending through said slot and adapted to be tripped periodically by said valve actuating means, means for holding said trigger in resilient relation with said valve actuating means, and a make and break mechanism adapted to be operated by said trigger.

7. A spark retarding mechanism adapted for special use in connection with a rotary engine comprising a valve action casing, a slidable base on said casing, and a distributor block terminal associated with said base and insulated therefrom, said terminal being adapted periodically to establish electrical connection with a source of electrical energy.

8. In a make and break assembly adapted for special use in connection with a rotary engine, in combination, a valve action casing, a base movable with respect to said casing and mounted thereon, said make and break assembly being secured to said base and insulated therefrom, an adjustable stationary electrode insulated from said base, and a movable spring-retracted electrode adapted to make and break electrical connection with said stationary electrode.

9. A rotary engine casing comprising in combination an outer housing, flanges on said outer housing, a framework extending across each side of said housing, means for detachably connecting said framework to said flanges, an inner casing eccentrically positioned with respect to said outer housing, said framework having enlarged portions, and a shaft extending through said casing and mounted in said enlarged portions.

10. A valve adapted for special use in connection with a rotary engine, said valve comprising a piston, packing means for said piston, a stem connected to said piston, a side extension projecting from one end of said stem, and a projection on said stem for engaging the endless groove of the valve operating means for said engine, said stem being also provided with means whereby said projection may be lubricated.

11. A cross-head adapted for special use in connection with a rotary engine, said cross-head comprising a cylindrical member having an opening for receiving the shaft of the engine, said cross-head being also provided with means whereby said cross-head may be detachably associated with said engine, said cross-head being also provided with means for the reception of the valve stems of the valves of said engine.

12. A make and break mechanism adapted for special use in connection with a rotary engine, said mechanism comprising an arcuate plate, a distribution post mounted on said plate, and a make and break device insulated from said arcuate plate and detachably associated therewith, said make and break mechanism comprising a resiliently mounted trigger device, and a set of adjustable electrodes associated with said make and break device.

13. A piston adapted for special use in connection with a rotary engine, said piston comprising a hollow cylindrical device closed at one end and open at the other, sets of complementary inwardly extending hollow projections extending from the inner wall of said member, a cross pin for each pair of said projections, and an anti-friction roller mounted on one of said cross-pins.

14. In a rotary engine, a partly hollow cylindrical block, a set of cylinders projecting radially from said block, a ring extending around the ends of said cylinders, an oil receptacle surrounding each of said cylinders, said ring forming the outer closure for said oil receptacles, an inner closure for each of said oil receptacles secured to each of said cylinders, and a cylindrical dust excluding pan surrounding each of said oil receptacles.

In testimony whereof we have signed our names to this specification.

CHARLES WESLEY HELM.
ENOCH SELLBERG.